US012673523B2

(12) United States Patent　　　　(10) Patent No.:　　US 12,673,523 B2
Cui et al.　　　　　　　　　　　　(45) Date of Patent:　　　Jul. 7, 2026

(54) COUPLER AND VEHICLE WITH COUPLER

(71) Applicant: CRRC QIQIHAR ROLLING STOCK CO., LTD., Qiqihar (CN)

(72) Inventors: Yingjun Cui, Qiqihar (CN); Shiliang Fan, Qiqihar (CN); Qingmin Meng, Qiqihar (CN); Pengdi Jin, Qiqihar (CN); Yan Wang, Qiqihar (CN); Mingyu Wei, Qiqihar (CN)

(73) Assignee: CRRC QIQIHAR ROLLING STOCK CO., LTD., Qiqihar (CN)

( * ) Notice: Subject to any disclaimer, the term of this patent is extended or adjusted under 35 U.S.C. 154(b) by 282 days.

(21) Appl. No.: 18/279,028

(22) PCT Filed: Jul. 1, 2022

(86) PCT No.: PCT/CN2022/103406
　　§ 371 (c)(1),
　　(2) Date: Aug. 25, 2023

(87) PCT Pub. No.: WO2022/253357
　　PCT Pub. Date: Dec. 8, 2022

(65) Prior Publication Data
　　US 2024/0131881 A1　　Apr. 25, 2024
　　US 2024/0227471 A9　　Jul. 11, 2024

(30) Foreign Application Priority Data

Jun. 3, 2021　(CN) .......................... 202110622354.X

(51) Int. Cl.
　　*B60D 1/04*　　　　(2006.01)
　　*B60D 1/24*　　　　(2006.01)
　　　　　　(Continued)

(52) U.S. Cl.
　　CPC ............... *B60D 1/04* (2013.01); *B60D 1/243* (2013.01); *B61G 3/04* (2013.01); *B61G 3/06* (2013.01)

(58) Field of Classification Search
　　CPC . B60D 1/04; B60D 1/243; B61G 3/04; B61G 3/06
　　　　　　(Continued)

(56) References Cited

U.S. PATENT DOCUMENTS 1,144,024　A　*　6/1915　Blackmore .............. B61G 3/06
　　　　　　　　　　　　　　　　　213/127
2,007,450　A　*　7/1935　Kinne ...................... B61G 3/04
　　　　　　　　　　　　　　　　　213/151
　　　　　　　(Continued)

FOREIGN PATENT DOCUMENTS

CN　　　102295012　A　　12/2011
CN　　　108528471　A　　9/2018
　　　　　　(Continued)

OTHER PUBLICATIONS

Translation of Meng (Year: 2018).*
　　　　　　(Continued)

*Primary Examiner* — Jacob S. Scott
(74) *Attorney, Agent, or Firm* — MCANDREWS HELD & MALLOY, LTD

(57)　　　　　ABSTRACT

Provided in the present disclosure are a coupler and a vehicle with the coupler. The coupler includes: a coupler body, having an accommodating cavity, a first impact protection pin flange being disposed on the coupler body; and a coupler tongue, pivotally connected to the coupler body. The coupler tongue includes a head portion and a tail portion. The tail portion is positioned inside the accommodating cavity, and a first interval d is formed between an end surface of the tail portion and the coupler body. The coupler tongue further (Continued)

includes a second impact protection pin flange, and a second interval b is formed between the first impact protection pin flange and the second impact protection pin flange, wherein the first interval d and the second interval b satisfy: d<b.

16 Claims, 4 Drawing Sheets

(51) Int. Cl.
| | | |
|---|---|---|
| *B61G 3/04* | (2006.01) | |
| *B61G 3/06* | (2006.01) | |

(58) Field of Classification Search
USPC ........................................................ 280/504
See application file for complete search history.

(56) References Cited

U.S. PATENT DOCUMENTS

| | | | | |
|---|---|---|---|---|
| 2,626,064 | A * | 1/1953 | Kayler | B61G 3/04 |
| | | | | 213/155 |
| 2,832,477 | A * | 4/1958 | Metzger | B61G 3/04 |
| | | | | 213/154 |
| 2,857,057 | A * | 10/1958 | Metzger | B61G 3/04 |
| | | | | 213/155 |
| 2,948,414 | A * | 8/1960 | Metzger | B61G 3/04 |
| | | | | 213/146 |
| 3,670,901 | A * | 6/1972 | Metzger | B61G 3/04 |
| | | | | 213/151 |
| 4,090,615 | A * | 5/1978 | Martin | B61G 3/04 |
| | | | | 213/151 |
| 4,206,849 | A * | 6/1980 | Kaim | B61G 3/06 |
| | | | | 213/151 |
| 4,976,363 | A | 12/1990 | Altherr | |
| 5,050,684 | A | 9/1991 | Vollmer | |
| 5,285,911 | A | 2/1994 | Altherr | |
| 2017/0232503 | A1 * | 8/2017 | Nibouar | B22C 1/00 |
| | | | | 164/138 |
| 2022/0371633 | A1 * | 11/2022 | Vithani | B61G 5/00 |

FOREIGN PATENT DOCUMENTS

| | | | | |
|---|---|---|---|---|
| CN | 108839664 | A | 11/2018 | |
| CN | 108839665 | A | 11/2018 | |
| CN | 108839666 | A * | 11/2018 | B61G 3/12 |
| CN | 210680730 | U | 6/2020 | |
| CN | 113147287 | A | 7/2021 | |
| GB | 1031442 | A | 6/1966 | |

OTHER PUBLICATIONS

International Search Report, with a mailing date of Sep. 28, 2022, in International application No. PCT/CN2022/103406, filed on Jul. 1, 2022.

Han, Meirong; Shen, Zhong Non-official translation: Analysis and Improvement of Ear Crack Damage of No. 13 Coupler) (Rolling Stock Technology), No. 1, Feb. 28, 2006 (Feb. 28, 2006), ISSN: 1007-6034, pp. 22-24.

SIPO search report dated Sep. 29, 2022, in Chinese application No. 202110622354.X (2 pages).

Examination report No. 1 dated Aug. 26, 2024 in Australian application No. 2022285707 (5 pages).

* cited by examiner

Fig. 3

COUPLER AND VEHICLE WITH COUPLER

CROSS-REFERENCE TO RELATED APPLICATION

The present disclosure is a 371 of International Patent Application No. PCT/CN2022/103406, filed X, 2019, which claims priority to Chinese Patent Application No. CN 202110622354. X filed to the China National Intellectual Property Administration on Jun. 3, 2021 and entitled "Coupler and Vehicle with Coupler", the disclosure of which is hereby incorporated by reference in its entirety.

TECHNICAL FIELD

The present disclosure relates to a technical field of road transport vehicles, in particular to a coupler and a vehicle with the coupler.

BACKGROUND

At present, for couplers widely used in the world, main bearing parts in an impact condition are a traction platform of a coupler tongue, an impact platform of a coupler body, and an impact protection pin flange. The impact platform bears a load first, and then the impact protection pin flange and the impact platform jointly bear the load. The impact platform of the coupler tongue and the impact platform of the coupler body cooperate to contact and bear the load. The impact protection pin flange of the coupler tongue cooperates with the impact protection pin flange of the coupler body to contact and bear the load. For impact stops of the coupler tongue and coupler body, in the impact condition, the impact stop of the coupler body limits the inward rotation of the coupler tongue and blocks the coupler tongue.

Since an impact platform gap is smaller than a protection pin flange gap, in the impact condition, the impact platform first contacts and bears force, and with the wear and tear of the use, when the impact platform gap increases to be equal to the protection pin flange gap, the protection pin flange participates in bearing the load, and jointly bears and transmits a longitudinal impact load with the impact platform. Due to relatively weak structural strength of the impact protection pin flange, when the protection pin flange bears the load, premature fracture and breakage may occur to the protection pin flange, which may affect the normal use of the coupler, shorten the service life, and cause the coupler to be scrapped prematurely.

SUMMARY

The present disclosure mainly aims to provide a coupler and a vehicle with the coupler for solving the problem in the prior art that a protection pin flange of the coupler is prone to being broken, causing the coupler to be scrapped.

In order to realize the above objective, according to an aspect of the present disclosure, provided is a coupler, including: a coupler body, wherein the coupler body is provided with a first impact protection pin flange; and a coupler tongue, pivotally connected with the coupler body. The coupler tongue includes a head portion and a tail portion. The tail portion is disposed inside the accommodating cavity, and a first interval d is formed between an end surface of the tail portion and the coupler body. The coupler tongue further includes a second impact protection pin flange, and a second interval b is formed between the first impact protection pin flange and the second impact protection pin flange, wherein the first interval d and the second interval b satisfy: d<b.

In some embodiments, the coupler body is provided with a first impact platform. The coupler tongue further includes a second impact platform. A third interval a is formed between the first impact platform and the second impact platform, wherein a<d.

In some embodiments, the end surface of the tail portion is a first arc-shaped surface that protrudes outwards, the coupler body is provided with a concave second arc-shaped surface that cooperates with the first arc-shaped surface, and the distance between the first arc-shaped surface and the second arc-shaped surface forms the first interval.

In some embodiments, the first interval d, the second interval b and the third interval a satisfy: $0 \leq a \leq 52.5$ mm, $2.5$ mm$\leq b \leq 55$ mm, and $2.5$ mm$\leq d \leq 54.5$ mm.

In some embodiments, the coupler also includes a pin shaft, the coupler body is provided with a first pin hole, the coupler tongue is provided with a second pin hole, and the pin shaft penetrates the first pin hole and the second pin hole. The pin shaft is in clearance fit with the second pin hole. A fourth interval c is formed between the pin shaft and an inner wall surface of the second pin hole, and the second interval b and the fourth interval c satisfy: b<c.

In some embodiments, the fourth interval c satisfies: $2.9$ mm$\leq c \leq 55$ mm.

In some embodiments, the first impact protection pin flange is surroundingly arranged on the outer periphery of the first pin hole, and the second impact protection pin flange is surroundingly arranged on the outer periphery of the second pin hole. The first impact platform is located on the outer side of the first impact protection pin flange, and the second impact platform is located on the outer side of the second impact protection pin flange.

In some embodiments, the first impact platform includes a first upper impact platform and a first lower impact platform. The second impact platform includes a second upper impact platform and a second lower impact platform. The third interval a is formed between the first upper impact platform and the second upper impact platform. The third interval a is formed between the first lower impact platform and the second lower impact platform.

In some embodiments, the first impact protection pin flange includes a first upper impact protection pin flange and a first lower impact protection pin flange. The second impact protection pin flange includes a second upper impact protection pin flange and a second lower impact protection pin flange. The second interval b is formed between the first upper impact protection pin flange and the second upper impact protection pin flange. The second interval b is formed between the first lower impact protection pin flange and the second lower impact protection pin flange.

According to another aspect of the present disclosure, provided is a vehicle, including a plurality of vehicle bodies and a coupler arranged between two adjacent vehicle bodies, the coupler being the above coupler.

By applying the technical solution of the present disclosure, since the first interval d is smaller than the second interval b, when the coupler is subjected to an impact load, the load on the tail portion of the coupler tongue is increased and the tail portion may bear the load prior to the second impact protection pin flange. Not only the tail portion can participate in bearing the impact load, but also can the first impact protection pin flange and the second impact protection pin flange be prevented from bearing the load prematurely, further the stress of other impact bearing parts can be reduced, and the service life of the first impact protection pin flange and the second impact protection pin flange can also be prolonged, thus improving the stress state of the entire coupler, and improving the safety and reliability of transportation.

BRIEF DESCRIPTION OF THE DRAWINGS

The drawings consisting of a part of the disclosure are used for further understanding of the present disclosure. The schematic embodiments and description thereof are used for explaining the disclosure and do not limit the disclosure improperly. In the drawings.

FIG. 3 illustrates a section view I of an embodiment of a coupler body according to the present disclosure;

Herein, the above drawings include the following reference numbers:

10: Coupler body; 11: First impact platform; 111: First upper impact platform; 112: First lower impact platform; 12: First impact protection pin flange; 121: First upper impact protection pin flange; 122: First lower impact protection pin flange; 13: Second arc-shaped surface; 14: First pin hole; 20: Coupler tongue; 21: Head portion; 22: Tail portion; 221: First arc-shaped surface; 23: Second impact platform; 231: Second upper impact platform; 232: Second lower impact platform; 24: Second impact protection pin flange; 241: Second upper impact protection pin flange; 242: Second lower impact protection pin flange; 25: Second pin hole; and 30: Pin shaft.

DETAILED DESCRIPTION OF THE EMBODIMENTS

It is to be noted that the embodiments of the present disclosure and the features in the embodiments may be combined with each other without conflict. The disclosure will be described in detail with reference to the accompanying drawings and embodiments.

The technical solutions in the embodiments of the invention will be clearly and completely described below in combination with the drawings in the embodiments of the invention. It is apparent that the described embodiments are not all embodiments but part of embodiments of the invention. In fact, the description of at least one exemplary embodiment below is merely illustrative, and will not be taken as any limitation to the invention and its application or use. All other embodiments obtained by those of ordinary skill in the art on the basis of the embodiments in the disclosure without creative work shall fall within the scope of protection of the present disclosure.

Figure 1:
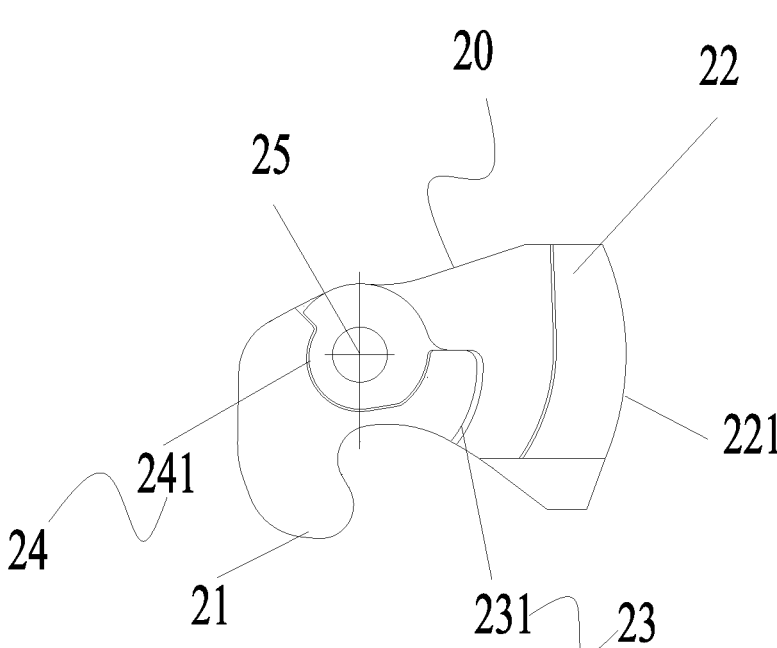
FIG. 1 illustrates a top view of an embodiment of a coupler tongue according to the present disclosure.
Figure 4:
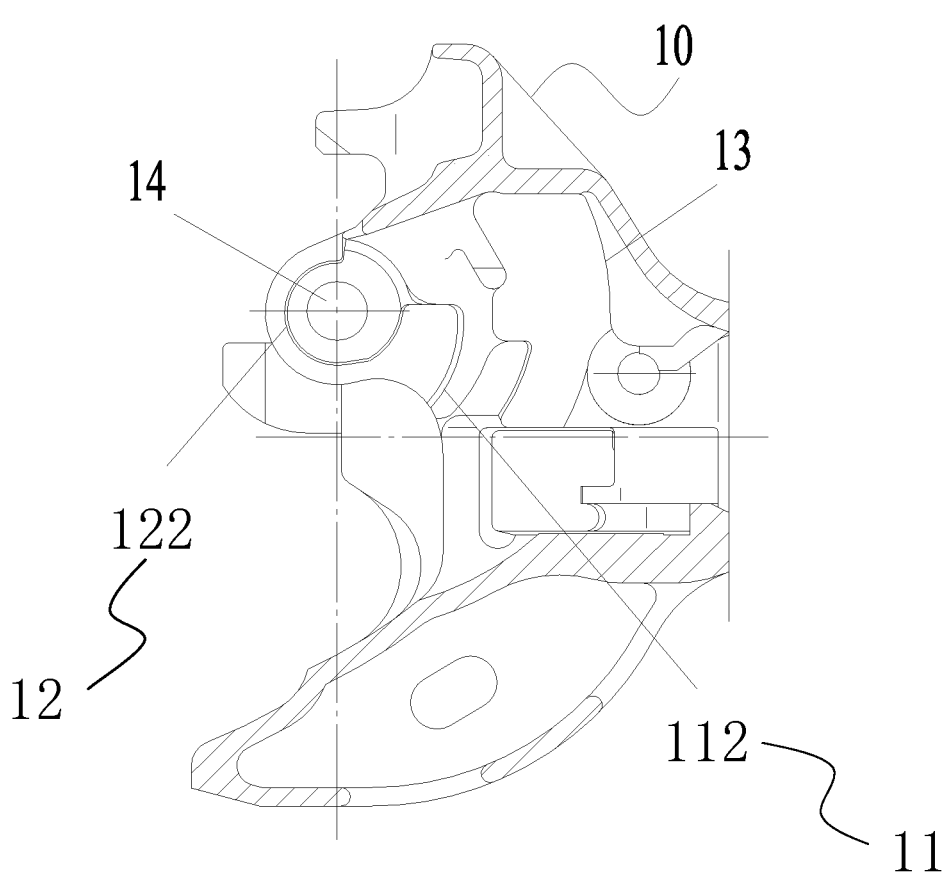
FIG. 4 illustrates a section view II of the coupler body of FIG. 3.
Figure 6:
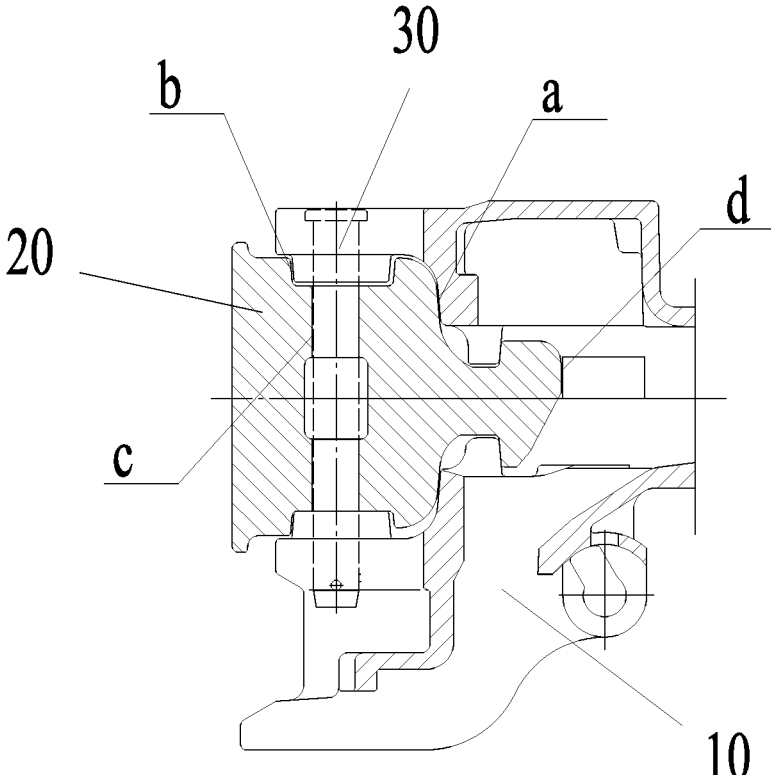
FIG. 6 illustrates a section view II of the coupler of FIG. 5.

As shown in FIGS. 1, 4 and 6, the present embodiment provides a coupler, including a coupler body 10 and a coupler tongue 20. The coupler body 10 has an accommodating cavity, and a first impact protection pin flange 12 is disposed on the coupler body 10. The coupler tongue 20 is pivotally connected with the coupler body 10, the coupler tongue 20 includes a head portion 21 and a tail portion 22, the tail portion 22 is disposed inside the accommodating cavity, and a first interval d is formed between an end surface of the tail portion 22 and the coupler body 10. The coupler tongue 20 further includes a second impact protection pin flange 24, and a second interval b is formed between the first impact protection pin flange 12 and the second impact protection pin flange 24, where the first interval d and the second interval b satisfy: d<b.

In the present embodiment, since the first interval d is smaller than the second interval b, when the coupler is subjected to an impact load, the load on the tail portion 22 of the coupler tongue 20 is increased and the tail portion may bear the load prior to the second impact protection pin flange 24. Not only the tail portion 22 can participate in bearing the impact load, but also can the first impact protection pin flange 12 and the second impact protection pin flange 24 be prevented from bearing the load prematurely, further the stress of other impact bearing parts can be reduced, and the service life of the first impact protection pin flange 12 and the second impact protection pin flange 24 can also be prolonged, thus improving the stress state of the entire coupler, and improving the safety and reliability of transportation.

Figure 2:
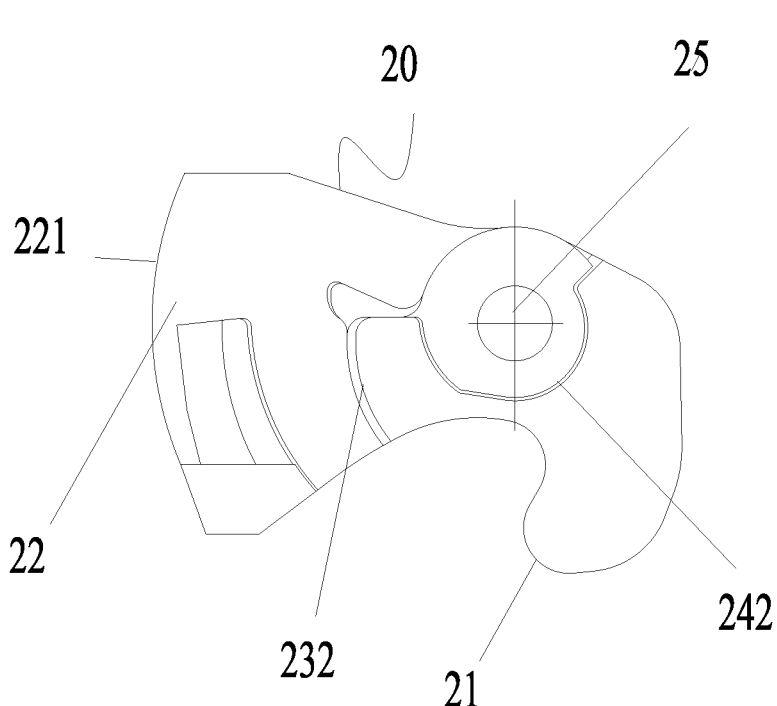
FIG. 2 illustrates a bottom view of a coupler tongue of FIG. 1.
Figure 3:
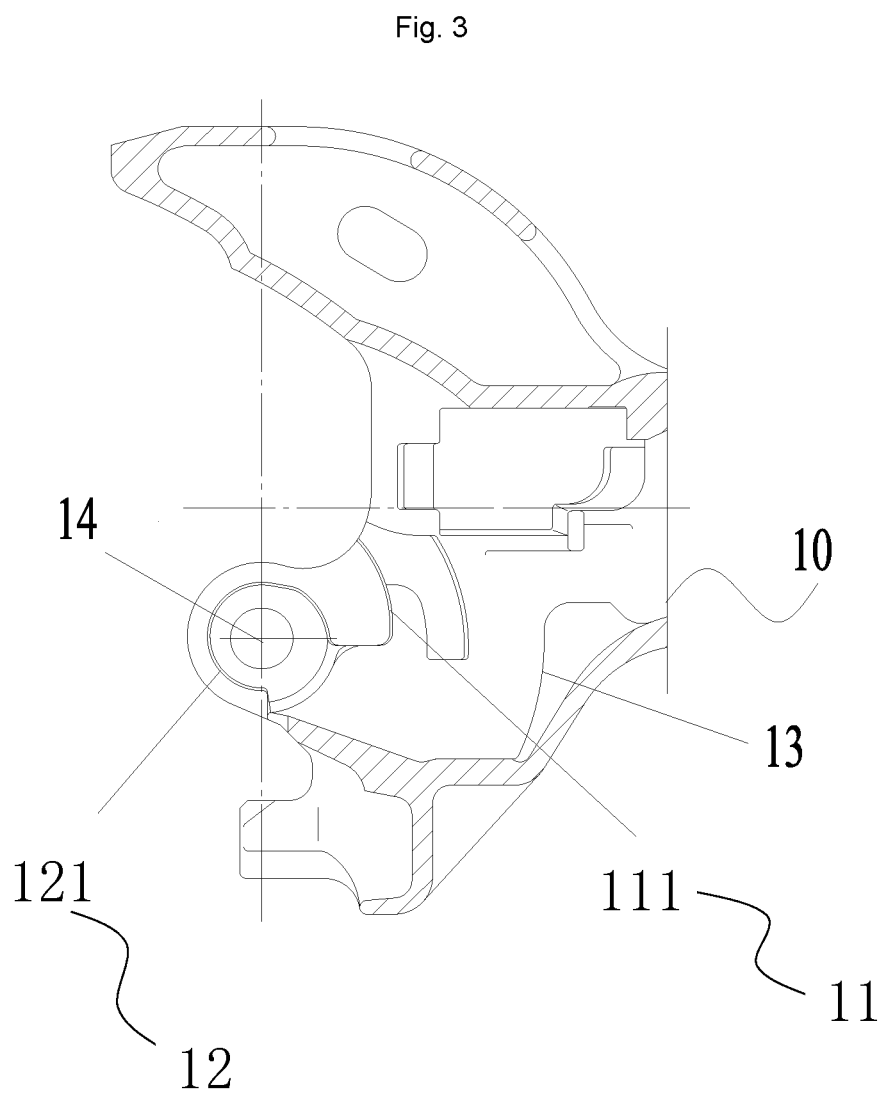

As shown in FIGS. 2, 3 and 6, in the present embodiment, the coupler body 10 is provided with a first impact platform 11. The coupler tongue 20 also includes a second impact platform 23. A third interval a is formed between the first impact platform 11 and the second impact platform 23, wherein a<d.

Specifically, since the third interval is greater than the first interval, when the coupler is subjected to an impact load, the load bearing sequence of the coupler is: the first impact platform 11 and the second impact platform 23 bear the load first, and during the load bearing process, the third interval a gradually increases under the impact of the load. When the third interval a increases to be equal to the first interval d or greater than the first interval d, a matching structure between the tail portion 22 of the coupler tongue 20 and the coupler body 10 jointly bear the impact load together with the first impact platform 11 and the second impact platform 23. Under a further impact of the load, the third interval a also gradually increases. When the third interval a increases to be equal to the second interval b or greater than the second interval b, the first impact protection pin flange 12 and the second impact protection pin flange 24 are also involved in load bearing. Such an arrangement increases the load bearing position of the coupler structure, thus optimizing the stress at each position, avoiding the phenomenon of stress concentration, and prolonging the service life of the coupler.

As shown in FIGS. 1 to 4, in the present embodiment, the end surface of the tail portion 22 is a first arc-shaped surface 221 that protrudes outwards, the coupler body 10 is provided with a concave second arc-shaped surface 13 that cooperates with the first arc-shaped surface 221, and the distance between the first arc-shaped surface 221 and the second arc-shaped surface 13 forms the first interval.

Through the above arrangement, the contact area between the tail portion 22 and the coupler body 10 is increased, thus improving the load bearing capacity of a joint between the tail portion 22 and the coupler body 10, and further improving the overall load bearing capacity of the coupler and the transmission capacity of the impact load.

Further, the first interval d, the second interval b and the third interval a satisfy: 0≤a≤52.5 mm, 2.5 mm≤b≤55 mm, and 2.5 mm≤d≤54.5 mm.

Preferably, the first interval d in the present embodiment is 1 mm or 1.5 mm or 2 mm, the second interval b is 3.5 mm or 4 mm or 4.5 mm, and the third interval a is 3 mm or 3.5 mm or 4 mm.

The setting of the above intervals can meet assembly requirements of the coupler, and the setting of each interval can also meet the requirements of the load bearing sequence of the coupler.

As shown in FIG. 6, in the present embodiment, the coupler also includes a pin shaft 30, the coupler body 10 is provided with a first pin hole 14, the coupler tongue 20 is provided with a second pin hole 25, and the pin shaft 30 penetrates the first pin hole 14 and the second pin hole 25.

Wherein, the pin shaft 30 is in clearance fit with the second pin hole 25. A fourth interval c is formed between the pin shaft 30 and an inner wall surface of the second pin hole 25, and the second interval b and the fourth interval c satisfy: b<c.

Through the above arrangement, under the impact of the load, when the second interval b gradually increases to be equal to the fourth interval c or greater than the fourth interval, the pin shaft 30 and an inner wall surface of the second pin hole 25 are also involved in load bearing. At this moment, the entire coupler has four structures participating in load bearing: the first impact platform 11 and the second impact platform 23, the first arc-shaped surface 221 and the second arc-shaped surface 13, the first impact protection pin flange 12 and the second impact protection pin flange 24, and the pin shaft 30 and the second pin hole 25.

With the application and loss of the coupler, parts that transmit the impact load and bear the impact load under the impact load are as follows: the first impact platform 11 and the second impact platform 23, the first arc-shaped surface 221 and the second arc-shaped surface 13, the first impact protection pin flange 12 and the second impact protection pin flange 24, and the pin shaft 30 and the second pin hole 25. Compared with the prior art, the coupler in the present embodiment has four load bearing parts, which may effectively bear and disperse the impact load, thus improving the overall stress state of the coupler, enabling structure layout to be more reasonable, prolonging the service life of the coupler, reducing the maintenance workload increased due to the fracture of the coupler tongue and coupler body of the coupler, and improving the safety and reliability of transportation.

Further, the fourth interval c satisfies: 2.9 mm≤c≤55 mm.

Preferably, the fourth interval c in the present embodiment is 3.5 mm or 4 mm or 4.5 mm. A value range of the above fourth interval c can satisfy the assembly requirements of the coupler.

It is to be noted that although the value ranges of b, c and d overlap, the values of b, c and d need to satisfy d<b<c.

In an alternative embodiment not shown in the drawings, the interval between the first impact protection pin flange 12 and the second impact protection pin flange 24 may also be increased, so that the second interval b is much larger than the fourth interval c, and accordingly the first impact protection pin flange 12 and the second impact protection pin flange 24 do not participate in load bearing. At this moment, the parts of the coupler, which transmit and bear the impact load under the impact load are sequentially as follows: the first impact platform 11 and the second impact platform 23, the first arc-shaped surface 221 and the second arc-shaped surface 13, and the pin shaft 30 and the second pin hole 25. That is, the load bearing of the first impact protection pin flange and the second impact protection pin flange in the prior art is converted to the load bearing of the first arc-shaped surface 221 and the second arc-shaped surface 13. Thus, the problem of fracture caused by insufficient strength of the impact protection pin flange may also be solved, and the technical effect of prolonging the service life of the coupler may be realized.

Figure 5:
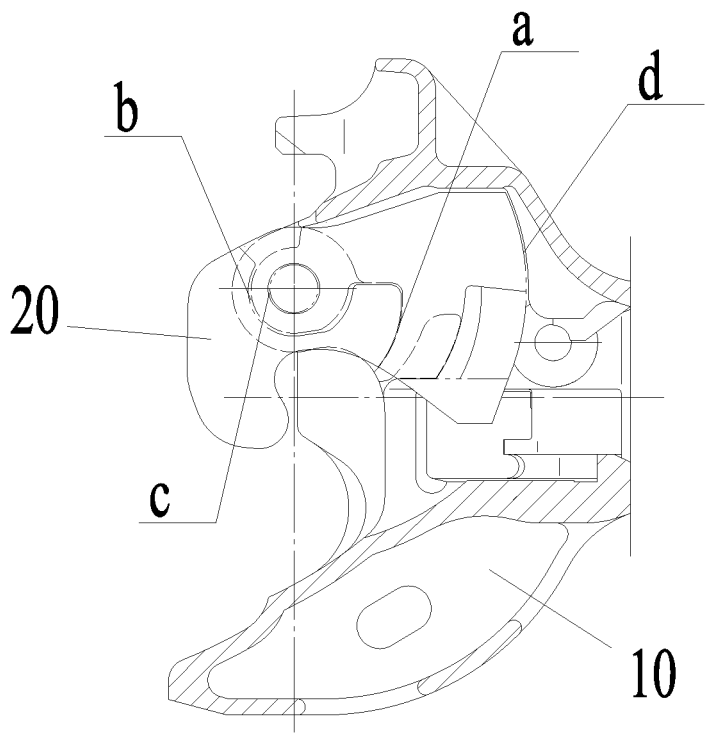
FIG. 5 illustrates a section view I of a coupler according to the present disclosure.

As shown in FIGS. 5 and 6, in the present embodiment, the first impact protection pin flange 12 is surroundingly arranged on the outer periphery of the first pin hole 14, and the second impact protection pin flange 24 is surroundingly arranged on the outer periphery of the second pin hole 25. The first impact platform 11 is located on the outer side of the first impact protection pin flange 12, and the second impact platform 23 is located on the outer side of the second impact protection pin flange 24.

Specifically, the first impact protection pin flange 12 is an arc-shaped step arranged on the outer periphery of the first pin hole 14, and the radian of the first impact protection pin flange 12 is greater than 270°. The second impact protection pin flange 24 is an arc-shaped step arranged on the outer periphery of the second pin hole 25, and the radian of the second impact protection pin flange 24 is greater than 180° and less than 270°. When the coupler tongue 20 is assembled on the coupler body 10, the first impact protection pin flange 12 is located on the inner side of the second impact protection pin flange 24, the outer wall surface of the first impact platform 11 corresponds to and is spaced from the outer wall surface of the second impact platform 23, and the first impact protection pin flange 12 corresponds to and is spaced from the second impact protection pin flange 24.

The first impact platform 11 is located on the outer side of the first impact protection pin flange 12, the second impact platform 23 is located on the outer side of the second impact protection pin flange 24, and the third interval between the first impact platform 11 and the second impact platform 23 is smaller than the second interval between the first impact protection pin flange 12 and the second impact protection pin flange 24; therefore, when the coupler is subjected to the impact load, the first impact platform 11 and the second impact platform 23 collide and bear the load prior to the first impact protection pin flange 12 and the second impact protection pin flange 24, thereby playing the role in protecting the first impact protection pin flange 12 and the second impact protection pin flange 24, and further effectively preventing the first impact protection pin flange 12 and the second impact protection pin flange 24 with relatively weak structural strength from prematurely bearing the load and being broken.

As shown in FIGS. 1 to 4, in the present embodiment, the first impact platform 11 includes a first upper impact platform 111 and a first lower impact platform 112. The second impact platform 23 includes a second upper impact platform 231 and a second lower impact platform 232. The third interval a is formed between the first upper impact platform 111 and the second upper impact platform 231. The third interval a is formed between the first lower impact platform 112 and the second lower impact platform 232.

Through the above arrangement, the first upper impact platform 111 is arranged corresponding to the second upper impact platform 231, and the first lower impact platform 112 is arranged corresponding to the second lower impact platform 232, thereby effectively bearing the impact load in an axial direction of the pin shaft 30, realizing dispersion of impact force and reasonable force distribution, avoiding local stress, and prolonging the service life of the coupler.

As shown in FIGS. 1 to 4, in the present embodiment, the first impact protection pin flange 12 includes a first upper impact protection pin flange 121 and a first lower impact protection pin flange 122. The second impact protection pin flange 24 includes a second upper impact protection pin flange 241 and a second lower impact protection pin flange 242. The second interval b is formed between the first upper impact protection pin flange 121 and the second upper impact protection pin flange 241. The second interval b is formed between the first lower impact protection pin flange 122 and the second lower impact protection pin flange 242.

Through the above arrangement, the impact load is effectively borne in the axial direction of the pin shaft 30, dispersion of the impact force and reasonable force distribution are realized, local stress is avoided, and the service life of the coupler is prolonged.

The present embodiment further provides a vehicle, including a plurality of vehicle bodies and a coupler arranged between two adjacent vehicle bodies, the coupler being the above coupler.

In the present embodiment, since the first interval d is smaller than the second interval b, when the coupler is subjected to an impact load, the load on the tail portion 22 of the coupler tongue 20 is increased and the tail portion may bear the load prior to the second impact protection pin flange 24. Not only the tail portion 22 can participate in bearing the impact load, but also can the first impact protection pin flange 12 and the second impact protection pin flange 24 be prevented from bearing the load prematurely, further the stress of other impact bearing parts can be reduced, and the service life of the first impact protection pin flange 12 and the second impact protection pin flange 24 can also be prolonged, thus improving the stress state of the entire coupler, and improving the safety and reliability of transportation.

With the application and loss of the coupler, parts that transmit the impact load and bear the impact load under the impact load are as follows: the first impact platform 11 and the second impact platform 23, the first arc-shaped surface 221 and the second arc-shaped surface 13, the first impact protection pin flange 12 and the second impact protection pin flange 24, and the pin shaft 30 and the second pin hole 25. Compared with the prior art, the coupler in the present embodiment has four load bearing parts, which may effectively bear and disperse the impact load, thus improving the overall stress state of the coupler, enabling structure layout to be more reasonable, prolonging the service life of the coupler, reducing the maintenance workload increased due to the fracture of the coupler tongue and coupler body of the coupler, and improving the safety and reliability of transportation.

Therefore, the vehicle having the above coupler also has the above advantages.

The technical solution of the present disclosure has the following advantages:

(1) by adjusting the tail portion of the coupler tongue and its corresponding coupler body structure, the tail portion of the coupler tongue cooperates with the coupler body to assist the impact platform in participating in bearing the impact load; and the coupler may be assisted in transmitting the impact load, thereby reducing the stress of other impact bearing parts;

(2) the load bearing sequence is changed, and an impact platform gap is smaller than a tail portion gap, smaller than a protection pin flange gap, and smaller than a coupler tongue pin hole gap; and it may be ensured that the protection pin flange and the coupler tongue pin may not bear the load prematurely, thus effectively prolonging the service life of the protection pin flange of the coupler tongue and of the coupler body and the coupler tongue pin;

(3) in the technical solution, only the tail structure of the coupler tongue of the coupler and its corresponding coupler body matching structure are adjusted without changing other structures of the coupler body and the coupler tongue, thus improving the stress state, and the solution is simple and easy to implement;

(4) the technical solution may be widely applied to articulated couplers for locomotives and vehicles, etc., to improve the structural strength of the parts such as the impact protection pin flange and the coupler tongue pin of the coupler tongue and of the coupler body, to avoid a problem of premature fracture of the coupler tongue and the coupler body, and to prolong the service life of the coupler tongue and coupler body of the coupler; and (5) the technical solution may reduce the maintenance workload increased due to the fracture of the coupler tongue and coupler body of the coupler, and improve the safety and reliability of transportation.

The above technical solution may be widely applied to the articulated couplers for locomotives and vehicles, etc., to improve the structural strength of the parts such as the impact protection pin flange and the coupler tongue pin of the coupler tongue and the coupler body, to avoid the problem of premature fracture of the coupler tongue and the coupler body, and to prolong the service life of the coupler tongue and coupler body of the coupler.

The above technical solution does not affect the coupling performance and three-state action performance of the coupler, and does not change the work habits of an operator. The technical solution may be widely applied to the articulated couplers for locomotives and vehicles.

It is to be seen from the above description that the above embodiments of the present disclosure have achieved the following technical effects:

Since the first interval d is smaller than the second interval b, when the coupler is subjected to the impact load, the load on the tail portion of the coupler tongue is increased and the tail portion may bear the load prior to the second impact protection pin flange. Not only the tail portion can participate in bearing the impact load, but also can the first impact protection pin flange and the second impact protection pin flange be prevented from bearing the load prematurely, further the stress of other impact bearing parts can be reduced, and the service life of the first impact protection pin flange and the second impact protection pin flange can also be prolonged, thus improving the stress state of the entire coupler, and improving the safety and reliability of transportation.

The above is only the preferred embodiments of the disclosure and is not used to limit the disclosure. For those skilled in the art, there may be various changes and variations in the disclosure. Any modifications, equivalent replacements, improvements and the like made within the spirit and principle of the disclosure shall fall within the scope of protection of the disclosure.

What is claimed is:

1. A coupler, comprising:

a coupler body, having an accommodating cavity, wherein the coupler body is provided with a first impact protection pin flange; and a coupler tongue, pivotally connected with the coupler body, wherein the coupler tongue comprises a head portion and a tail portion, the tail portion is disposed inside the accommodating cavity, and a first interval d is formed between an end surface of the tail portion and the coupler body, wherein the coupler tongue further comprises a second impact protection pin flange, and a second interval b is formed between the first impact protection pin flange and the second impact protection pin flange, wherein the first interval d and the second interval b satisfy: d<b;

wherein the coupler body is provided with a first impact platform, wherein the coupler tongue further comprises a second impact platform, and a third interval a is formed between the first impact platform and the second impact platform, wherein a<d.

2. The coupler according to claim 1, wherein the end surface of the tail portion is a first arc-shaped surface that protrudes outwards, the coupler body is provided with a concave second arc-shaped surface that cooperates with the first arc-shaped surface, and a distance between the first arc-shaped surface and the second arc-shaped surface forms the first interval.

3. The coupler according to claim 2, wherein the first interval d, the second interval b and the third interval a satisfy: 0≤a≤2.5 mm, 2.5 mm≤b<5 mm, and 2.5 mm≤d<4.5 mm.

4. The coupler according to claim 1, wherein the coupler further comprises a pin shaft, the coupler body is provided with a first pin hole, the coupler tongue is provided with a second pin hole, and the pin shaft penetrates the first pin hole and the second pin hole, wherein the pin shaft is in clearance fit with the second pin hole, a fourth interval c is formed between the pin shaft and an inner wall surface of the second pin hole, and the second interval b and the fourth interval c satisfy: b<c.

5. The coupler according to claim 4, wherein the fourth interval c satisfies: 2.9 mm≤c≤5 mm.

6. The coupler according to claim 4, wherein the first impact protection pin flange is surroundingly arranged on an outer periphery of the first pin hole, the second impact protection pin flange is surroundingly arranged on an outer periphery of the second pin hole, the first impact platform is located on an outer side of the first impact protection pin flange, and the second impact platform is located on an outer side of the second impact protection pin flange.

7. The coupler according to claim 1, wherein the first impact platform comprises a first upper impact platform and a first lower impact platform, the second impact platform comprises a second upper impact platform and a second lower impact platform, the third interval a is formed between the first upper impact platform and the second upper impact platform, and the third interval a is formed between the first lower impact platform and the second lower impact platform.

8. The coupler according to claim 4, wherein the first impact protection pin flange comprises a first upper impact protection pin flange and a first lower impact protection pin flange, the second impact protection pin flange comprises a second upper impact protection pin flange and a second lower impact protection pin flange, the second interval b is formed between the first upper impact protection pin flange and the second upper impact protection pin flange, and the second interval b is formed between the first lower impact protection pin flange and the second lower impact protection pin flange.

9. A vehicle, comprising a plurality of vehicle bodies and a coupler arranged between two adjacent vehicle bodies, the coupler being the coupler according to claim 1.

10. The vehicle according to claim 9, wherein the end surface of the tail portion is a first arc-shaped surface that protrudes outwards, the coupler body is provided with a concave second arc-shaped surface that cooperates with the first arc-shaped surface, and a distance between the first arc-shaped surface and the second arc-shaped surface forms the first interval.

11. The vehicle according to claim 9, wherein the first interval d, the second interval b and the third interval a satisfy: 0≤a≤2.5 mm, 2.5 mm≤b<5 mm, and 2.5 mm≤d≤4.5 mm.

12. The vehicle according to claim 9, wherein the coupler further comprises a pin shaft, the coupler body is provided with a first pin hole, the coupler tongue is provided with a second pin hole, and the pin shaft penetrates the first pin hole and the second pin hole, wherein the pin shaft is in clearance fit with the second pin hole, a fourth interval c is formed between the pin shaft and an inner wall surface of the second pin hole, and the second interval b and the fourth interval c satisfy: b<c.

13. The vehicle according to claim 12, wherein the fourth interval c satisfies: 2.9 mm≤c≤5 mm.

14. The vehicle according to claim 12, wherein the first impact protection pin flange is surroundingly arranged on an outer periphery of the first pin hole, the second impact protection pin flange is surroundingly arranged on an outer periphery of the second pin hole, the first impact platform is located on an outer side of the first impact protection pin flange, and the second impact platform is located on an outer side of the second impact protection pin flange.

15. The vehicle according to claim 9, wherein the first impact platform comprises a first upper impact platform and a first lower impact platform, the second impact platform comprises a second upper impact platform and a second lower impact platform, the third interval a is formed between the first upper impact platform and the second upper impact platform, and the third interval a is formed between the first lower impact platform and the second lower impact platform.

16. The vehicle according to claim 12, wherein the first impact protection pin flange comprises a first upper impact protection pin flange and a first lower impact protection pin flange, the second impact protection pin flange comprises a second upper impact protection pin flange and a second lower impact protection pin flange, the second interval b is formed between the first upper impact protection pin flange and the second upper impact protection pin flange, and the second interval b is formed between the first lower impact protection pin flange and the second lower impact protection pin flange.

* * * * *